Patented Jan. 12, 1937

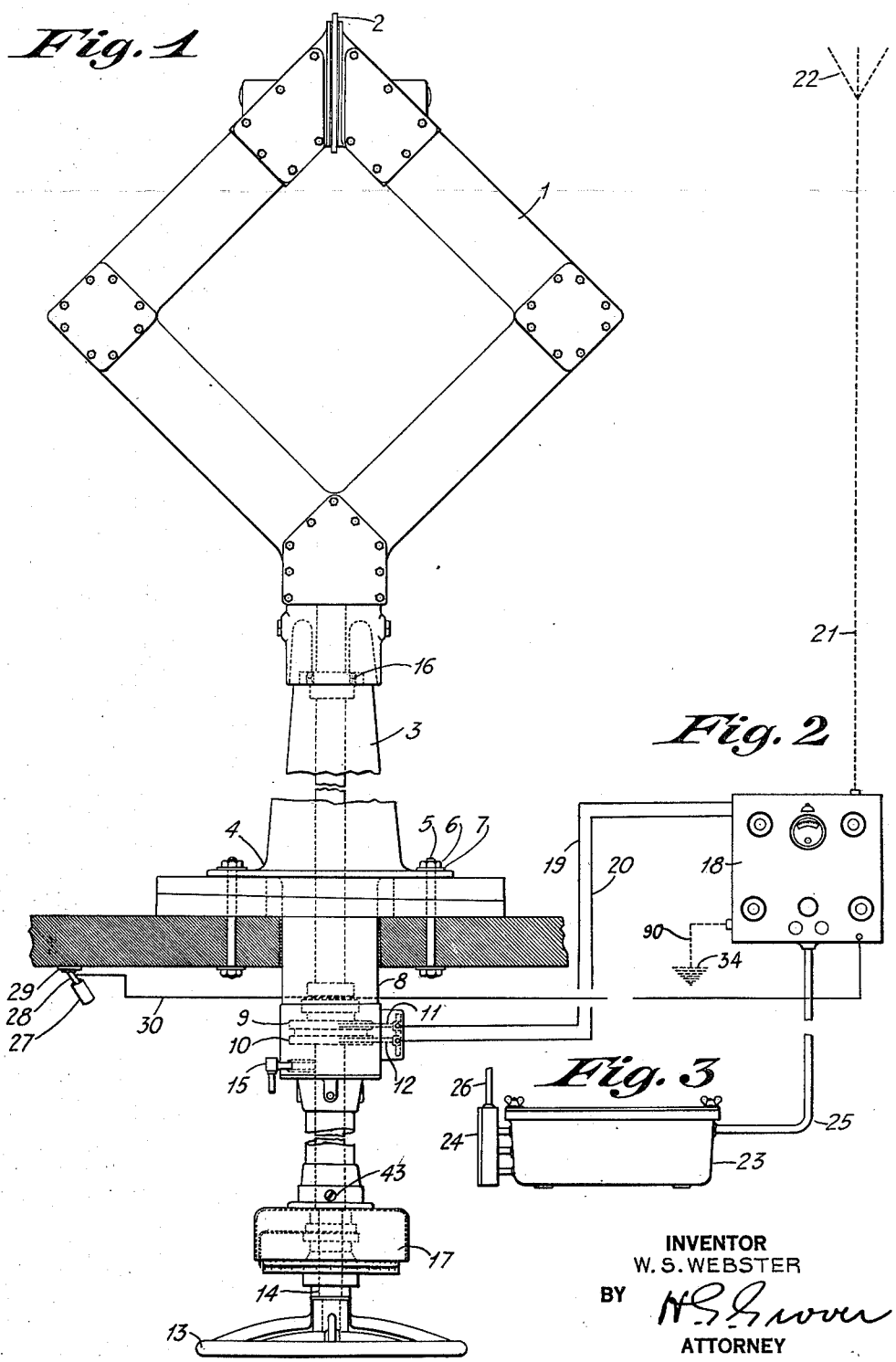

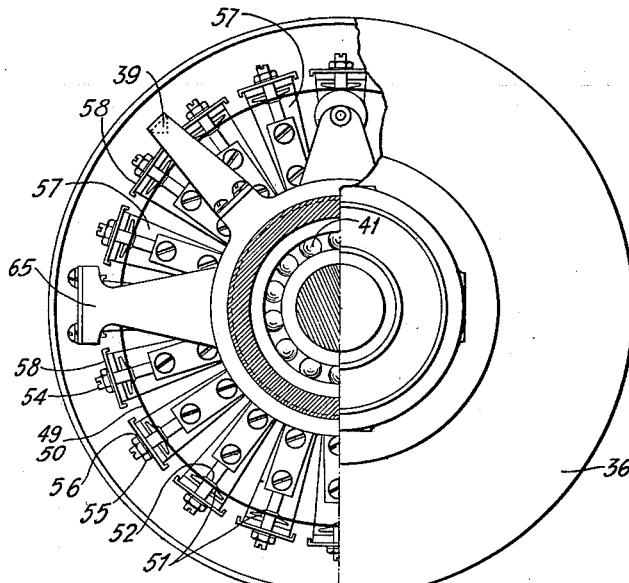

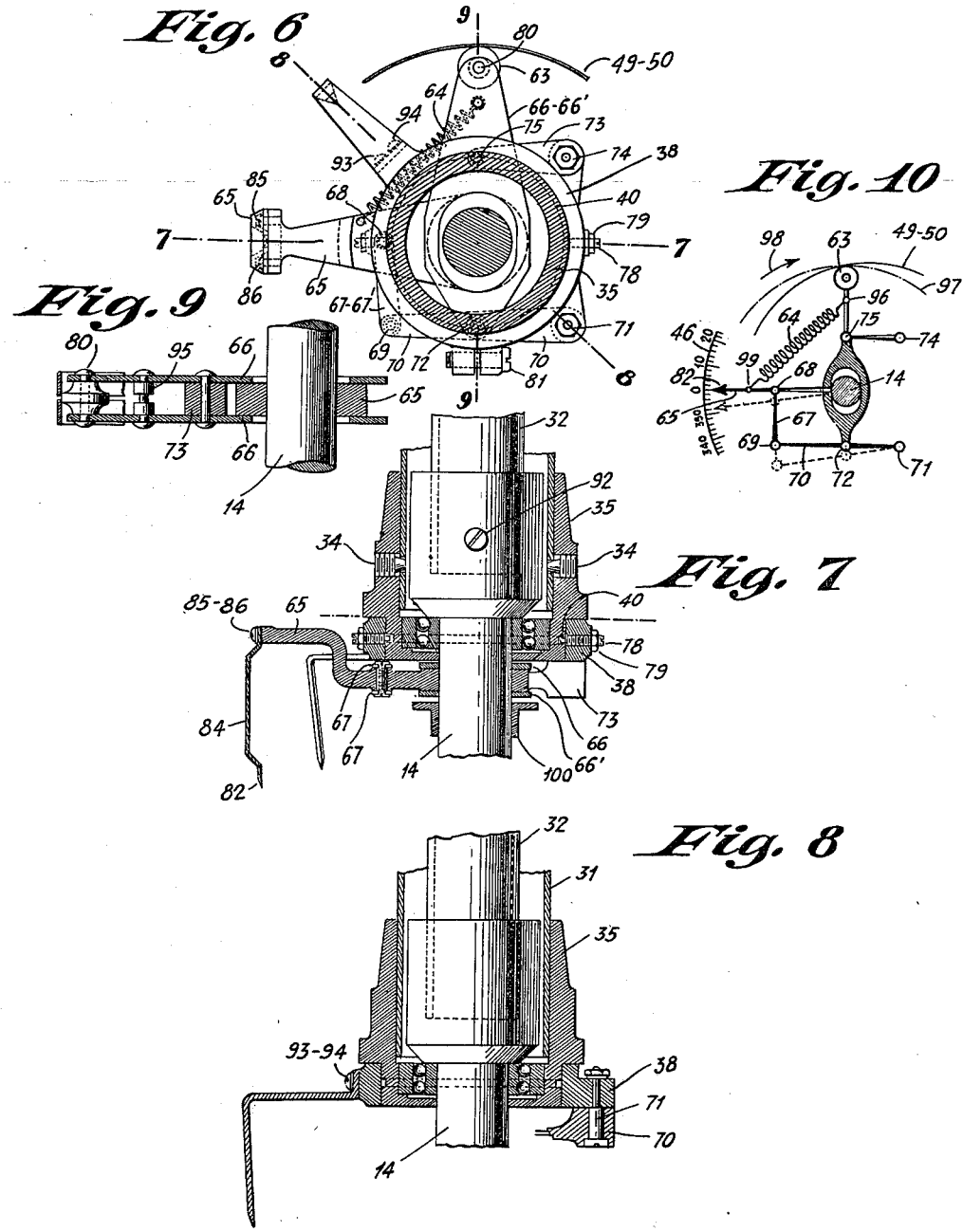

2,067,516

UNITED STATES PATENT OFFICE 2,067,516

RADIO DIRECTION FINDER

William S. Webster, Palmyra, N. J., assignor to Radio Corporation of America, a corporation of Delaware Application December 31, 1931, Serial No. 584,094

10 Claims. (Cl. 250—11)

This invention relates to an improved radio direction finder and more particularly the adjustable flexible band type mechanical compensator.

The object of this invention is to simplify and improve the construction of mechanical compensators generally as used on radio direction finders for vessels, portable field direction finders and the like.

Another object of this invention is to automatically correct for the distortion due to errors introduced by adjacent conducting objects, in order that the operator may instantly determine the true position of a ship or the direction of a radio signal without consulting a curve sheet or table of corrections for errors in using a radio direction finder.

A feature of this invention resides in the novel grouping in a compact housing a flexible band cam with adjusting means and the supporting of its linkage system together with associated fixed and movable pointers which is supported on a collar concentric with a single operating loop shaft and is an improvement over the prior art direction finders.

As is well known in the art of radio direction finding, an operator when taking radio compass bearings rotates the loop by means of a hand wheel and listens in with the head phones until he picks up a signal from a station the location of which he already knows. He then rotates the loop slowly until the signal disappears. This is called the "null" point and when that position is obtained he then notes his reading on a scale, but as there are introduced into the circuit certain objectionable errors or apparent bearings, caused by local metallic objects, etc., the "null" point as indicated on the scale may require certain corrections and the operator will need to make proper allowances for these errors either by referring to a curve sheet or table to indicate the amount of loop errors at that particular setting of the scale, or by means of a mechanical compensator which will indicate automatically the corrected bearings as determined visually in course of calibration.

In accordance with my invention, the operator will read the compensated and corrected "null" point on the scale which, by means of the mechanical compensator, will indicate directly corrected bearings. The setting of this compensator is accomplished by adjusting a flexible metallic band cam when the direction finder is calibrated. Simultaneous radio compass bearings and visual or pelorus bearings are taken at various angular positions while swinging the ship about a fixed point, or circling the direction finder with a transmitter, and from such readings and their differences, the necessary compensation for each of the bearings taken is determined. These corrections are then transferred to the compensator by adjustment of the flexible band cam which, cooperating with the oscillating pointer, will indicate the corrected reading or null point.

The invention consists of various other features and methods of construction as described and illustrated in the accompanying drawings. In the drawings like references refer to like parts, of which, Figure 1 is an elevation of a rotatable shielded loop shown as a typical direction finder installation on the deck of a vessel;

Fig. 2 is an elevation of the receiving apparatus and its connections to loop and sense antenna;

Fig. 3 is an elevation of the receiver battery box together with its associated leads;

Fig. 4 is a plan view of the adjustable band compensator with a portion of the cover broken away to show the operative elements;

Fig. 5 is a vertical cross section and a side elevation of Fig. 4, the section being taken on lines 5—5 of Fig. 4;

Fig. 6 is a plan view of the linkage system, the view being taken on lines 6—6 of Fig. 7;

Fig. 7 is a vertical cross section of the compensating pointer, the section being taken on lines 7—7 of Fig. 6;

Fig. 8 is a vertical cross section of the fixed or loop pointer, the section being taken on lines 8—8 of Fig. 6;

Fig. 9 is a vertical cross section of the roller, the section being taken on lines 9—9 of Fig. 6;

Fig. 10 is a diagram of the linkage system.

Referring now to the drawings, there is shown in Fig. 1 a metallic shielded loop housing 1 which is cast in one piece and insulated at the top by a bakelite dielectric partition 2 and supported by a pedestal 3 which is flared out to a flanged portion 4 which fastens to the deck by means of bolts 5, washers and nuts 6 and 7; directly below the flanged portion 4 there is a depending tubular portion 8 containing suitable collector rings 9 and 10, together with brushes 11 and 12 connecting the leads of the loop with the receiver. The loop is rotated by the hand wheel 13 and the shaft 14 which is clamped in position when desired, by the locking member 15. To insure ease in rotating the loop, suitable ball bearings 16 are provided. Supported on the shaft between the hand wheel 13 and the lock 15 there is located the flexible band compensator 17 which will be described more in detail in a following description.

Fig. 2 shows the receiver 18 together with its associated loop leads 19 and 20 and a shielded lead 21 shown by dotted line, connecting the sense antenna 22 with the receiver 18. The receiver 18 is provided with a suitable ground 34 by lead 90, as indicated by dotted line.

Fig. 3 shows a battery box 23 and a storage battery charger 24, the batteries being connected to the receiver 18 by shielded leads 25. The power supply is connected by suitable leads 26. A spot light 27 is fastened to the ceiling by an adjustable bracket 28, and is supported at 29 to illuminate the scale and pointer. Suitable leads 30 connect the light with the receiver 18.

Referring to Figs. 4 and 5 of the drawings, there is shown an outer tubular housing 31, a loop drive tube 32 terminating in a drive shaft 14 which rotates the loop 1 by means of hand wheel 13. There is fastened to the lower portion of the tubular housing 31 by means of screws 34 a ball bearing and cover support 35. A compensator cover 36 is provided to keep out dust and also prevent any change in the adjustment of the compensator after it has once been set. This cover is fastened to the support member 35 by means of screws 37. Directly below the cover is a movable collar 38 on which the fixed pointer 39 is mounted. In order to maintain concentricity between fixed and rotating parts in the compensator an additional ball bearing 41 is set in the lower portion of the cover support 35. There is fastened to the drive shaft 14 by means of screws 43 the main body portion of the compensator 42. Surrounding the main body portion are two circumferential scales both graduated from 0 to 360 degrees. The upper or fixed scale 44 is securely fastened to the main body portion of the compensator by means of four screws 45, and has an additional engraved dot 33 to indicate the position of the loop, the lower or adjustable scale 46 is also fastened to the main body portion so as to be free to turn when desired, and is held in place by a collar 47 and screws 48. To provide and give the proper friction to this lower scale a special washer 49 is so arranged to give freedom of rotation so as to be capable of being set by the operator for any desired ship's course, and also turn integral with the loop as does the upper scale 44.

The flexible and adjustable cam is indicated as being formed by two metallic strips, of which 49 indicates the upper band and 50 the lower. A block 51 is shown as being forced in a forward position and held against the studs 52 by means of screws 54, nuts 55, and washers 56. The finger 57, by means of which the proper adjustment of the flexible band is accomplished, is attached to a channel strip 58 extending below the finger 57, and has provided in it a slot for the adjusting screws 59. To give accurate but radially adjustable position to these fingers 57, a pair of screws 60 cooperating with a lock spring 61, are fastened to the main body 42.

Referring now to Fig. 6, the flexible band roller 63 is shown bearing against the flexible bands 49 and 50, in order to take up any back lash, and likewise, to keep the roller against the flexible bands, there is provided a spring 64 which is fastened to the movable extension or oscillating pointer arm 65 at the outer end of the roller supports 66 and 66'. Connected to the oscillating pointer arm 65 is a pair of links 67 and 67' which is pivoted by means of pivots 68 and 69. At right angles to the links 67 and 67' there is a somewhat longer connecting link 70 which is fastened to the collar 38 by the pivot 71, and pivoted with the roller supports 66 and 66' by pivot 72 to give the desired movement to the pointer 65. To keep the roller support 66 on a substantially radial line there is provided an additional short link 73 which is likewise pivoted to the collar 37 by the pivot 74 and linked by means of a pivot 75 to the roller supports 66 and 66'. The roller 63 rotates and is fastened to the supports 66 and 66' by means of a stud 80.

Fig. 7 shows the location of the oscillating pointer arm 65, 90 degrees from the roller 63 shown in Fig. 6, which is the position known as zero compensation, or in other words, the position where the roller 63 does not impart any movement or oscillations to the pointer arm 65 which is loosely fitted around the loop operating shaft 14, and guided by links 70 and 73 a pointer 84 is fastened to the oscillating pointer arm 65 by means of screws 85 and 86. A bushing 100 keeps the pointer arm 65 in its proper position on the shaft 14. The adjustable support collar 38 is fastened to the cover support 35 by means of screws 78 and nuts 79 engaging in the slot 40 which is cut continuously around the cover support and after being set in a proper operating position in respect to the fixed pointer and loop, which position is determined when the direction finder is first installed, and to prevent further rotation there is provided a clamping screw 81. The loop drive shaft 14 is made integral with the drive tube 91 by means of a pin 92. The oscillating pointer 65 is shown projecting beyond the cover at a point 82, and reads directly on the lower scale 46.

Fig. 8 shows the location and method by which the fixed pointer is fastened to the support collar 38 by means of screws 93 and 94.

Fig. 9 indicates a supporting stud 95 which spaces the roller supports 66 and 66' and further provides a fastening for the spring 64 at a point 96.

In the operation of this improved compensator and referring particularly to Fig. 10 which shows a diagram of the linkage system, and more clearly defines that portion of the invention and the position of the oscillating or movable pointer being at zero compensation in respect to the loop as mentioned above in Fig. 6, when the operator rotates the loop by means of the shaft 14, and as the main body of the compensator 42 and the flexible bands 49 and 50, also the circumferential scales 44 and 46 are fastened to the drive shaft 14, all these elements will rotate as an integral unit with the loop. If flexible bands 49 and 50 are set in the form of a true circle concentric with loop shaft, or, in other words, a constant radius as indicated by the dot and dash line 97, there will be no compensation or movement of the oscillating pointer 82. However, should the flexible cam be adjusted to conform with the full line, then, as the loop is rotated to the right, as shown by the arrow 98, the roller 63 will be forced downward and continue in such a position until the minimum radius is reached, and as the roller supports 66 and 66' are slotted and are free to move downward, also by means of the short link 73 which is held in a fixed position at pivots 74 and 75, and the long connecting link 70 which is pivoted at points 71 and 72, the roller supports 66 and 66' will be constrained to a path determined by links 73, approximating a straight radial line when the roller 63 is forced downward as mentioned above, as the spring 64 is of tension type and is stretched between points 67 and 96, it will result in keeping the roller 63 always in contact with the metallic bands 49 and 50 which form the flexible cam. However, as the oscillating pointer 82 is connected to the connecting link 70 by additional links 67 and 67', the pointer 82 will move downward and it is this downward movement of the pointer 82 that indicates the corrected reading as adjusted and set up on the installation of the direction finder mentioned above, the result being that the position of the oscillating pointer indicates on the scale 46 a lesser number of degrees than that of the actual mechanical position of the loop. Similarly, an upward movement or a position where the oscillating pointer indicates a greater number of degrees than that of the actual mechanical position of the loop, occurs when the roller 63 passes the zero compensation line and continues in an upward position until a point of maximum radius is reached.

Although this invention has been described as embodied in a particular form or arrangement of parts, it should be understood that it is capable of being embodied in other and different forms within the spirit and scope of the appended claims, such as a fixed pointer replacing the oscillating pointer 84, and variable or oscillating motion being imparted to the scale 46 by connecting the scale to the links 67 and 67' in the same general manner as the pointer 84, as is indicated in Figs. 6 and 10.

What I claim is:

1. A mechanical compensator comprising a central rotatable operating shaft, a wheel-like support fastened to said operating shaft, a fixed scale with graduations in degrees located around the periphery of said support, a plurality of adjustable members arranged radially on said support, said adjustable members having spring means for securing said adjustable members in sliding engagement on said support, each one of said adjustable members having a pair of studs to retain an adjustable band cam, said cam comprising two flexible bands, a movable graduated scale fastened to the hub portion of said wheel-like support, a supporting member for said compensator having an adjustable collar fastened to the end of said supporting member, said collar having a pair of pivot points for retaining a linkage system, said linkage system comprising a single link arm, a double link arm, both of said links being pivoted to a roller support, a roller fixed for rotation in the end of said support, a movable pointer fastened to the extreme end of said double link, and a spring member between said roller support and said movable pointer to keep said roller in contact with said flexible band cam to indicate predetermined compensation between the readings on said fixed and movable scales.

2. A radio direction finder compensator for use with a rotatable loop, a mechanical movement mounted upon a disk-like support and fixed to the loop shaft, a scale having graduations on the periphery of said disk-like support and fixed to said loop shaft, an oscillating pointer for reading the indications on said scale, a second adjustable scale concentric with said loop shaft, an adjustable band cam secured to said disk-like support so as to rotate with said loop shaft comprising a pair of flexible bands located on and within the confines of said disk-like support, a roller bearing on said band and cooperating with a plurality of links which are connected and held from complete rotation to said oscillating pointer said oscillating pointer being moved in a fixed relation with respect to said band to indicate corrected readings on said adjustable scale.

3. A radio direction finder compensator for use with a loop which is mounted upon a single operating shaft having at its end an operating hand wheel, comprising an adjustable compensator which is located intermediate the loop and said operating hand wheel, a circumferential scale fixed to said shaft, an adjustable scale held in frictional engagement with said operating shaft a flexible band cam having a plurality of adjustable members located within said compensator, a linkage system having a roller held in frictional engagement with said flexible band cam so that said adjustable members cooperate with said roller and said linkage system to compensate for predetermined errors means for having said roller bear against the inner surface of said flexible band cam, an oscillating pointer secured to the linkage system and cooperating with said adjustable scale for indicating on said adjustable scale the corrected bearings.

4. A radio direction finder compensator for use with a loop which is mounted on a rotatable shaft, said compensator comprising a scale fixed to said rotatable shaft, and an adjustable scale held in frictional engagement with said rotatable shaft, said scales having graduations on their periphery, a fixed pointer, an oscillating pointer held from complete rotation on said compensator, a flexible band cam secured so as to rotate with said rotatable shaft comprising two bands, a roller cooperating with a linkage system to move said oscillating pointer said roller having means for maintaining contact with the inner surface of said flexible band cam to indicate corrected readings as predetermined from observed errors on said adjustable scale.

5. A radio direction finder compensator for use with a loop mounted upon a continuously rotatable operating shaft, said compensator comprising two scales one of which is fixed and the other adjustable with respect to said rotatable operating shaft, said scales having graduations in degrees, said graduations being located on the periphery of said scales, a fixed and a movable pointer associated with said scales and loosely arranged around said shaft, a collar retaining said fixed pointer, said collar secured to said operating shaft, and a linkage system having an extension arm, said linkage system movably located on said shaft, a roller secured to said linkage system, an adjustable flexible band cam cooperating with said roller by having means whereby it is held in frictional contact against said roller, said roller being joined in operative engagement with said linkage system, the movable pointer being secured to said extension arm so as to oscillate the movable pointer to indicate predetermined corrected bearings on said adjustable scale.

6. In combination a radio direction finder compensator for use with a shielded loop mounted for rotation upon an operating shaft, comprising a pair of scales surrounding said operating shaft, one of said scales adjustably movable around said shaft but held in frictional engagement with said shaft so as to be set for a desired course, and the other scale fixed to said shaft, an adjustable flexible band cam for said compensator surrounding and fixed to said operating shaft, a linkage system having an extension arm, a roller secured to said linkage system, an oscillating pointer secured to said extension arm, means on said linkage system to cause said roller to bear against the inner surface of said flexible band cam to indicate automatically corrected course readings on the scale which is adjustably movable around said shaft.

7. A radio direction finder compensator for use with a loop which is mounted upon a rotatable shaft, said compensator comprising a non-rotatable housing having contained therein a disklike support attached to and rotatable with said shaft, a pair of flexible bands adjustably located on said disk-like support and movable with said shaft, and a plurality of adjusting means to adjust said flexible bands radially fastened to said disk-like support, a linkage system having a roller, said linkage system located within said housing an oscillating pointer, fixed to said linkage system and held from complete rotation, a scale which is adjustably located on said shaft said roller having means whereby it is held in frictional contact with the inner surface of said flexible band cam so that said oscillating pointer will indicate corrected readings on said scale.

8. A radio direction finder compensator for use with a rotatable loop, comprising two circumferential scales mounted on a rotatable loop shaft, one of said scales fixed to said shaft, the other scale being adjustably located with respect to said rotatable loop shaft but held in frictional engagement and concentric with said shaft, an oscillating pointer having linkage means comprising a roller, said oscillating pointer secured to said linkage means and held from complete rotation on said shaft, said linkage means cooperating with a flexible band cam whereby said roller is held in frictional engagement with said cam to indicate loop errors on said adjustable scale.

9. A compensating mechanism for rotatable loop aerial, comprising a base support for said loop aerial, an operating shaft for said aerial having a bearing in said base support, an adjustable collar fastened to said base support with indicating pointers fastened to said adjustable collar, a scale fixed for rotation with said operating shaft, and a second scale adjustably located on said shaft and normally rotatable therewith, at least one of said pointers held from complete rotation but adapted to oscillate, a linkage system having a roller, an adjustable band cam located on said fixed scale, means for holding said roller in contact with said adjustable band cam so as to oscillate said last mentioned pointer so as to indicate predetermined corrected readings on said second scale.

10. In a radio direction finder compensator, comprising a rotatable shaft member, a collar coaxially located with respect to said rotatable shaft member and normally rotatable therewith, a roller and a linkage system mounted on said collar, a wheel-like support mounted on said rotatable shaft for rotation therewith, an adjustable band cam mounted on said wheel-like support, a scale on the rim of said wheel-like support, an oscillator pointer secured to said linkage system and held from complete rotation on said compensator, resilient means for holding said roller in contact with said flexible band cam to impart a motion from said roller through said linkage system when said shaft is rotated, said oscillating pointer positioned so as to indicate corrected readings on said scale.

WM. S. WEBSTER.